United States Patent [19]

Putnam, Jr.

[11] Patent Number: 5,685,587
[45] Date of Patent: Nov. 11, 1997

[54] POSTHOLE DIGGER AND CLEANING ATTACHMENT

[76] Inventor: Ronald Glenn Putnam, Jr., 15031 Beatties Ford Rd., Huntersville, N.C. 28078

[21] Appl. No.: 613,840

[22] Filed: Mar. 11, 1996

[51] Int. Cl.$^6$ ........................................... A01B 1/18
[52] U.S. Cl. ...................... 294/50.5; 294/50.8; 294/60
[58] Field of Search .................. 294/49, 50, 50.5, 294/50.6, 50.7, 50.8, 59, 60; 111/101, 106, 107

[56] References Cited

U.S. PATENT DOCUMENTS

| | | | |
|---|---|---|---|
| 541,841 | 7/1895 | Doyle | 294/50.5 |
| 669,841 | 3/1901 | Koeth | 294/50.5 |
| 1,407,232 | 2/1922 | Stevens. | |
| 1,486,755 | 3/1924 | Ingersoll. | |
| 1,592,270 | 7/1926 | Johnson. | |
| 2,036,433 | 4/1936 | Nisewanger | 294/50.5 |
| 2,598,288 | 5/1952 | Navarre. | |
| 3,152,788 | 10/1964 | Hardwidge. | |
| 3,319,988 | 5/1967 | Smith. | |
| 3,608,644 | 9/1971 | Ambrose. | |
| 4,630,366 | 12/1986 | Fry. | |
| 4,807,625 | 2/1989 | Singleton. | |

*Primary Examiner*—Dean Kramer
*Attorney, Agent, or Firm*—Adams Law Firm, P.A.

[57] ABSTRACT

A posthole digger includes first and second spaced-apart and substantially upright handles for being gripped by a user at respective free ends. First and second cooperating blades depend from respective proximal ends of the handles. A cleaning attachment is located between the handles for removing accumulated earthen matter from an inside surface of the first and second blades when in the open position. An elongate rod extends between the handles, and is received within a hollow sleeve for sliding vertical movement relative to the sleeve. An inner scraper is attached to an end of the rod, and positioned between the first and second blades for reciprocating vertical movement along the length of the blades in the open position. A coil spring normally urges the inner scraper upwardly into a storage position adjacent to a top end of the blades. An extension is secured to the inner scraper for being depressed by the foot of a user against the force of the spring to move the inner scraper downwardly along the length of the blades.

17 Claims, 6 Drawing Sheets

POSTHOLE DIGGER AND CLEANING ATTACHMENT

TECHNICAL FIELD AND BACKGROUND OF THE INVENTION

This invention relates to a posthole digger with a cleaning attachment for removing accumulated earthen matter adhering to the blades of the digger during use. The cleaning attachment is readily adapted for use on existing posthole diggers, and is conveniently removable for repair or replacement as needed. The invention is durable, relatively inexpensive to manufacture, and requires little maintenance.

One post hole digger of the prior art, and disclosed in U.S. Pat. No. 2,598,288, includes a vertically movable inside scraper plate located between opposing blades of the digger. The scraper plate is attached to an elongated plunger rod extending between the handles, and slidably received within a stationary guide. The guide is located at a pivot point pivotably connecting the handles together slightly above the blades. A coil spring surrounds the plunger rod and acts to normally urge the scraper plate upwardly into a raised, inoperative position with the plunger rod extending vertically between the handles.

To actuate the scraper plate from its raised position, the user firmly grasps the handles of the digger and depresses a foot pedal attached to the top end of the plunger rod. The scraper plate moves downwardly against the force of spring to engage and remove any accumulated earthen matter adhering to the inside surface of the blades. When the scraper plate reaches the lower end of the blades, the user releases his foot from the foot pedal and the spring automatically returns the scraper plate to its raised inoperative position.

Although providing an improvement over conventional diggers without cleaning attachments, the above posthole digger of the '288 patent suffers from drawbacks and limitations. One drawback relates to the attachment of the foot pedal to the free end of the elongated plunger rod. When the inner scraper plate is in its raised position, the foot pedal is located a substantial vertically-spaced distance above the blades. The user must display exceptional balance and coordination to properly actuate the inside scraper plate in the intended manner, particularly when attempting to remove compact mud and clay from the blades. Moreover, due to the force applied by the foot of the user on the foot pedal, the plunger rod is likely to be bent or otherwise damaged over a relatively short period of use.

The present invention overcomes these and other such problems of the prior art by providing a posthole digger with an effective and easy to operate cleaning attachment. The cleaning attachment of the present attachment is actuated by the foot of the user directly on the scraper assembly itself. The cleaning attachment will not be readily damaged. Furthermore, the invention provides means for simultaneously cleaning both the inside and outside surfaces of the blades during use of the posthole digger.

SUMMARY OF THE INVENTION

Therefore, it is an object of the invention to provide a posthole digger with a cleaning attachment for easily removing accumulated earthen matter adhering to the blades of the digger during use.

It is another object of the invention to provide a cleaning attachment that is conveniently retrofit onto existing, conventional posthole diggers.

It is another object of the invention to provide a posthole digger including a cleaning attachment capable of simultaneously cleaning both inside and outside surfaces of the blades during use.

It is another object of the invention to provide a posthole digger including a cleaning attachment that is relatively inexpensive to manufacture.

It is another object of the invention to provide a posthole digger including a cleaning attachment that is easily removable for repair or replacement as needed.

It is another object of the invention to provide a posthole digger including a cleaning attachment that is durable, and requires little maintenance.

These and other objects of the present invention are achieved in the preferred embodiments disclosed below by providing a posthole digger having first and second spaced-apart and substantially upright handles for being gripped by a user at respective free ends. Pivot means are provided for pivotally attaching the handles together at their respective proximal ends. First and second cooperating blades depend from respective proximal ends of the handles. The blades are moveable between a generally open position for penetrating the ground surface, and a generally closed position for excavating.

A cleaning attachment is provided for removing accumulated earthen matter from an inside surface of the first and second blades when in the open position. The attachment includes a stationary hollow sleeve carried by the pivot means at proximal ends of the handles. An elongate rod extends between the handles, and is received within the sleeve for sliding vertical movement relative to the sleeve. Inner scraper means are attached to an end of the rod, and positioned between the first and second blades for reciprocating vertical movement along the length of the blades in the open position. Biasing means engage the rod for normally urging the inner scraper means upwardly into a storage position adjacent to a top end of the blades.

An extension is secured to the inner scraper means for being depressed by the foot of a user against the force of the biasing means to move the inner scraper means downwardly along the length of the blades. The inner scraper means removes accumulated earthen matter adhering to the inside surface of the blades.

According to one preferred embodiment of the invention, the inner scraper means is a scraper plate having opposing perimeter edges residing in closely spaced relation to respective blades in the open position. The scraper plate is moved vertically along the length of the blades to clean away accumulated earthen matter from the inside surface of the blades.

According to another preferred embodiment of the invention, the extension is an outward-extending flange integrally formed with the scraper plate, and located on one side of the posthole digger for ready access by the user.

According to yet another preferred embodiment of the invention, a second outward-extending flange is integrally formed with the scraper plate, and located on an opposite side of the posthole digger.

According to yet another preferred embodiment of the invention, the biasing means is a spring carried by the rod, and extending between a top end of the rod and the sleeve for normally urging the inner scraper means upwardly into the storage position.

According to yet another preferred embodiment of the invention, outer scraper means are secured to the extension and reside in closely-spaced relation to an outside surface of the blades. The outer scraper means are movable in unison with the inner scraper means to clean away accumulated earthen matter from the inside and the outside surfaces of the blades in the open position.

According to yet another preferred embodiment of the invention, the outer scraper means is a scraper ring attached to the extension, and extending in a generally circular path around the blades to reside adjacent the outside surface of the blades.

In another preferred embodiment, a posthole digger includes first and second spaced-apart and substantially upright handles for being gripped by a user at respective free ends. Pivot means are provided for pivotally attaching the handles together at their respective proximal ends. First and second cooperating blades depend from respective proximal ends of the handles. The blades are moveable between a generally open position for penetrating the ground surface, and a generally closed position for excavating.

A cleaning attachment is provided for removing accumulated earthen matter from an inside surface of the first and second blades when in the open position. The attachment includes first and second stationary hollow sleeves attached together and carried by the pivot means at proximal ends of the handles. First and second elongate rods extend between the handles, and are received within respective sleeves for unison, sliding vertical movement relative to the sleeves. Inner scraper means are attached to respective ends of the rods, and are positioned between the first and second blades for reciprocating vertical movement along the length of the blades in the open position. Biasing means engage the first and second rods for normally urging the inner scraper means upwardly into a storage position adjacent to a top end of the blades.

An extension is secured to the inner scraper means for being depressed by the foot of a user against the force of the biasing means to move the inner scraper means downwardly along the length of the blades. The inner scraper means removes accumulated earthen matter adhering to the inside surface of the blades.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
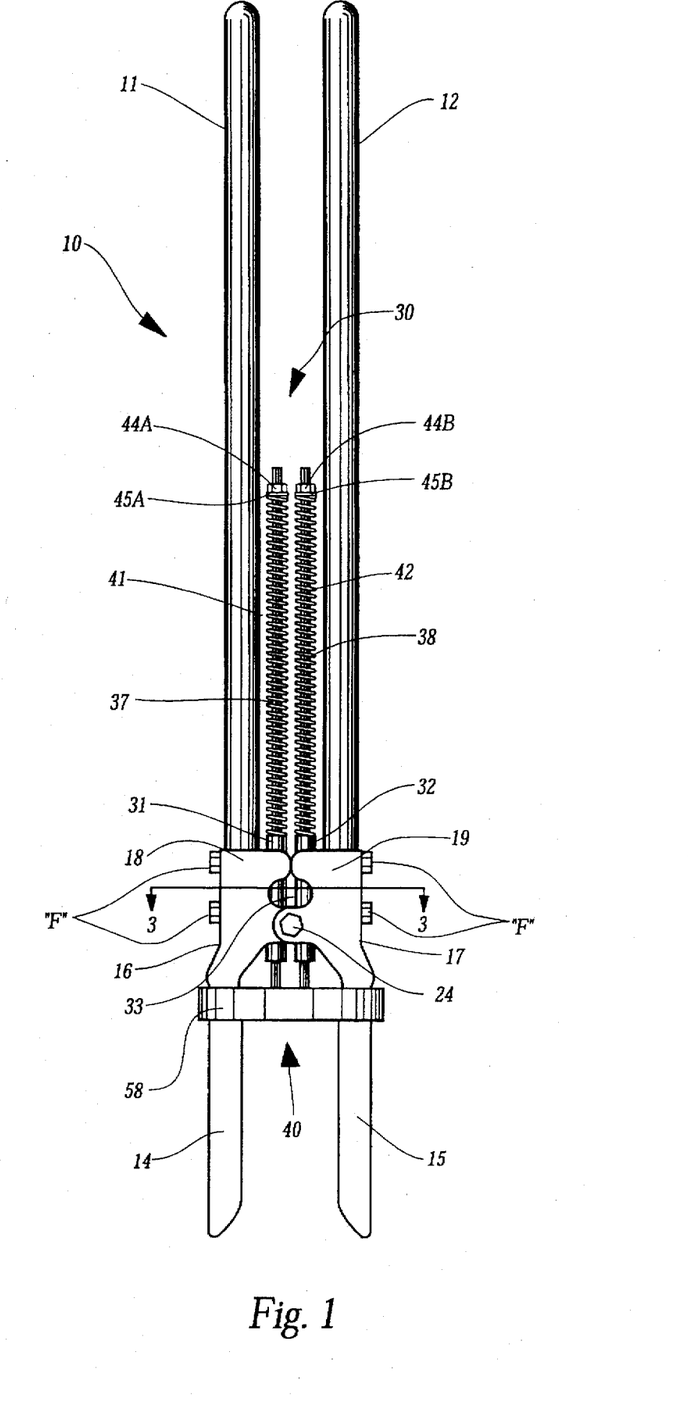
FIG. 1 is a front elevational view of the posthole digger with a cleaning attachment according to one preferred embodiment of the invention.

Referring now specifically to the drawings, a posthole digger according to the present invention is illustrated in FIG. 1 and shown generally at reference numeral 10. The posthole digger 10 is used in a conventional manner to dig holes for receiving fence posts, deck supports, and other structures set into the ground.

Figure 2:
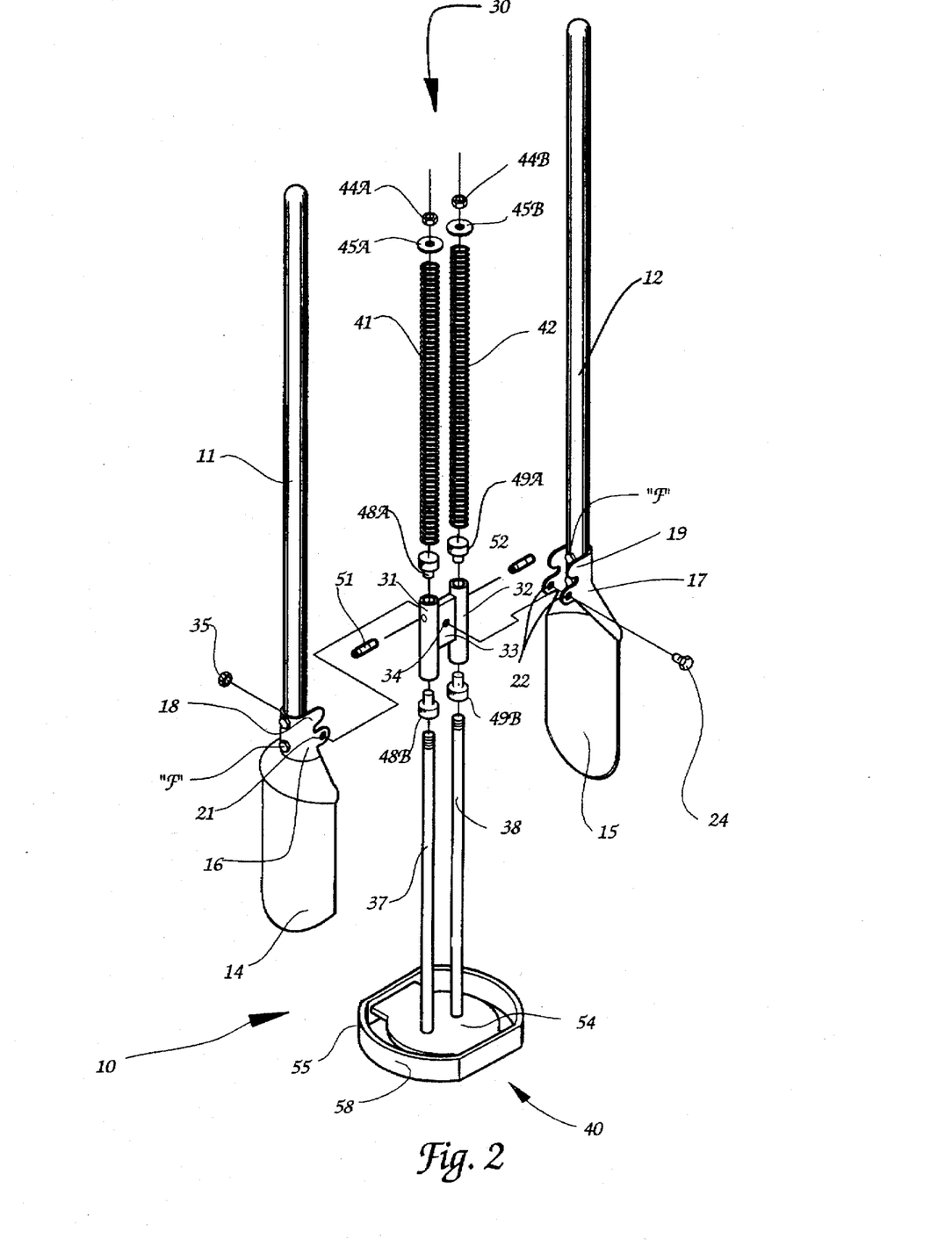
FIG. 2 is an exploded perspective view of the posthole digger and cleaning attachment.

The posthole digger 10 includes first and second substantially upright handles 11 and 12 for being gripped and manipulated by a user at respective free ends. Cooperating blades 14 and 15 depend from proximal ends of the handles 11 and 12, and include respective connecting portions 16 and 17 receiving fasteners "F" therethrough to connect the blades 14, 15 to the handles 11, 12. The connecting portions 16, 17 include respective pairs of spaced flanges 18 and 19 with openings 21 and 22, as best shown in FIG. 2, aligned to receive a threaded pivot bolt 24. The pivot bolt 24 pivotably joins the handles 11, 12 together, and permits pivoting movement of the blades 14, 15 between a generally open position (See FIG. 1) for penetrating the ground surface and a generally closed position (See FIG. 4) for excavating.

Referring to FIGS. 1 and 2, a cleaning attachment 30 is located between the handles 11, 12 and blades 14, 15 for dislodging earthen matter adhering to the inside and outside surfaces of the blades 14, 15 during use of the posthole digger 10. The cleaning attachment 30 includes spaced, hollow stationary sleeves 31 and 32 formed together with a center wall 33. The center wall 33 has an opening 34 for being aligned with openings 21, 22 of the flanges 18, 19, and receiving the pivot bolt 24 therethrough to locate the stationary sleeves 31, 32 in an area between the connecting portions 16, 17 of respective blades 14, 15. Once inserted through the aligned openings 21, 22, and 34, a threaded nut 35 is applied to a free end of the pivot bolt 24 to hold the bolt 24 in position.

First and second elongated rods 37 and 38 are attached to a scraper assembly 40, and received upwardly through the hollow sleeves 31, 32 to locate the scraper assembly 40 in a raised position shown in FIG. 1. The scraper assembly 40 is normally maintained in this position by coil springs 41 and 42 surrounding the rods 37, 38, and bearing against respective nuts 44A, 44B and washers 45A, 45B at free ends of the rods 37, 38 and the hollow sleeves 31, 32 supported by the pivot bolt 24. The free end of each rod 37, 38 and nut 44A, 44B have complementary screw threads for providing convenient assembly and disassembly. In addition, hollow nylon seals 48A, 48B and 49A, 49B, shown in FIG. 2, are preferably located at respective openings of the sleeves 31, 32 to prevent loose dirt and other debris from entering the sleeves 31, 32 and impairing sliding movement of the rods 37, 38. Standard grease fittings 51 and 52 may also be inserted in the sleeves 31, 32 for receiving a lubricating fluid to lubricate the rods 37, 38 as needed.

Figure 3:
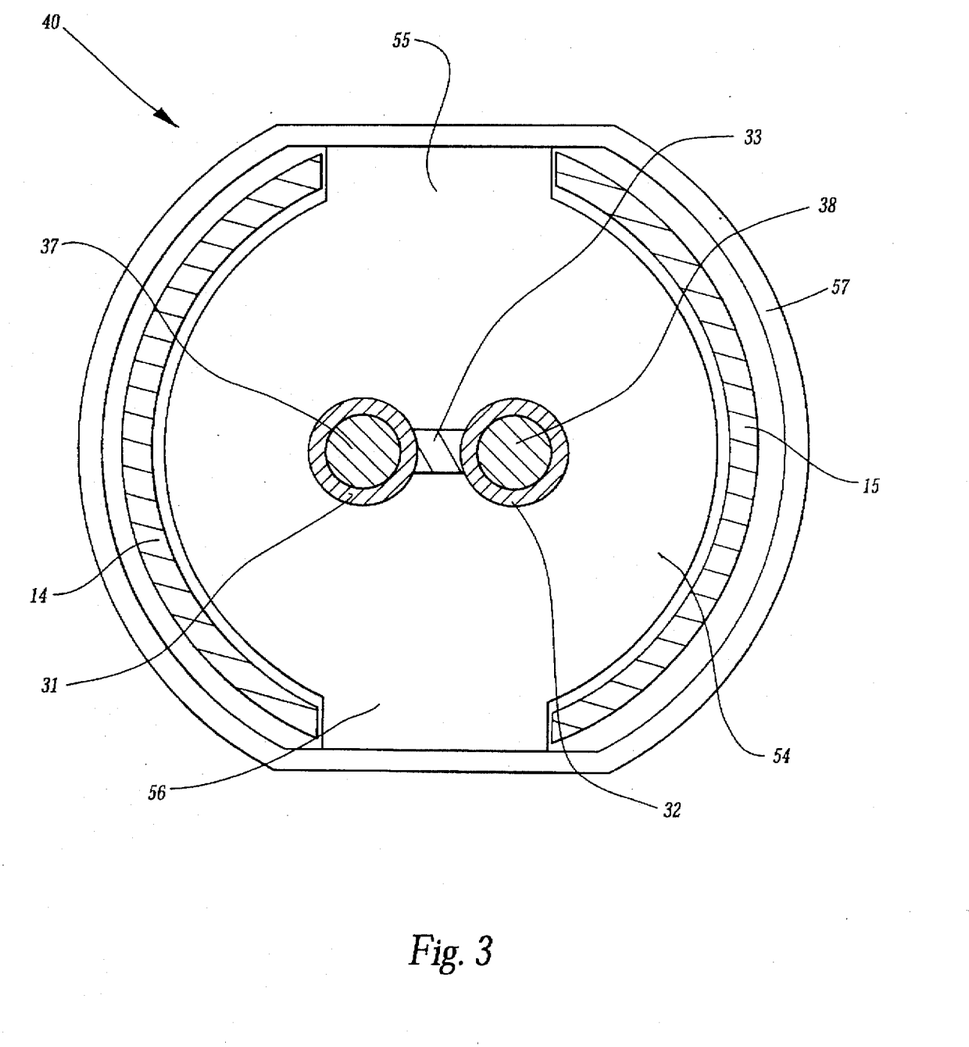
FIG. 3 is a cross-sectional view taken substantially along line 3—3 of FIG. 1.

As best shown in FIGS. 2 and 3, the scraper assembly 40 includes an inner scraper plate 54 located between the blades 14, 15 and including opposing, integrally-formed side flanges 55 and 56. The inner scraper plate 54 resides in closely spaced relation to the inside surface of the blades 14, 15, and is movable along the length of the blades 14, 15 in their open position of FIG. 1. An outer ring 58 is attached to the side flanges 55, 56 and extends around the outside of the blades 14, 15 in closely spaced relation to the outside surface of the blades 14, 15. The side flanges 55, 56 provide sufficient surface area for directly supporting the foot of the user as the scraper assembly 40 is moved downwardly along the length of the blades 14, 15.

Operation of the posthole Digger 10

Figure 4:
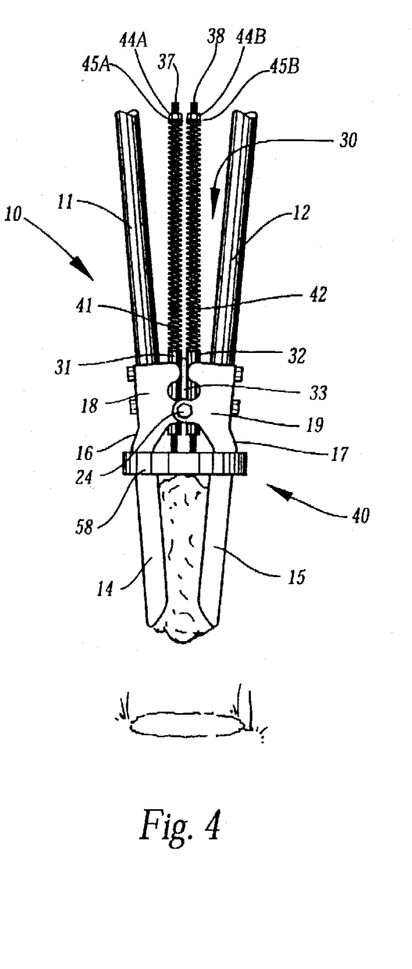
FIGS. 4, 5, and 6 are sequential views illustrating operation of the posthole digger and cleaning attachment.
Figure 5:
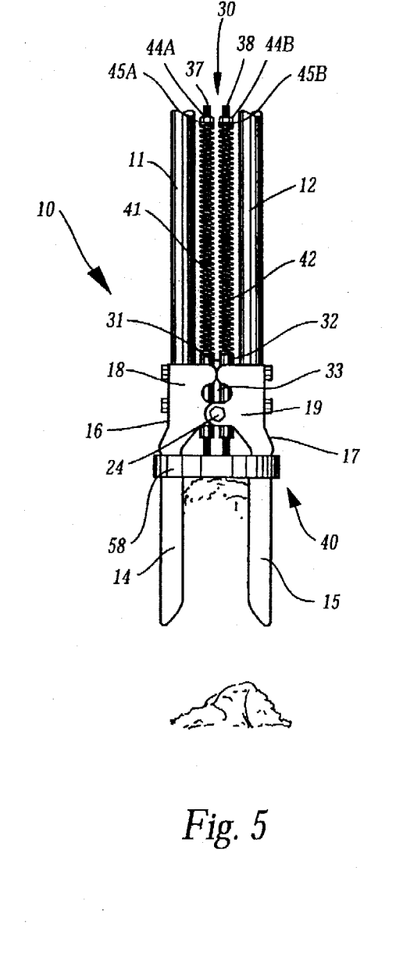
Figure 6:
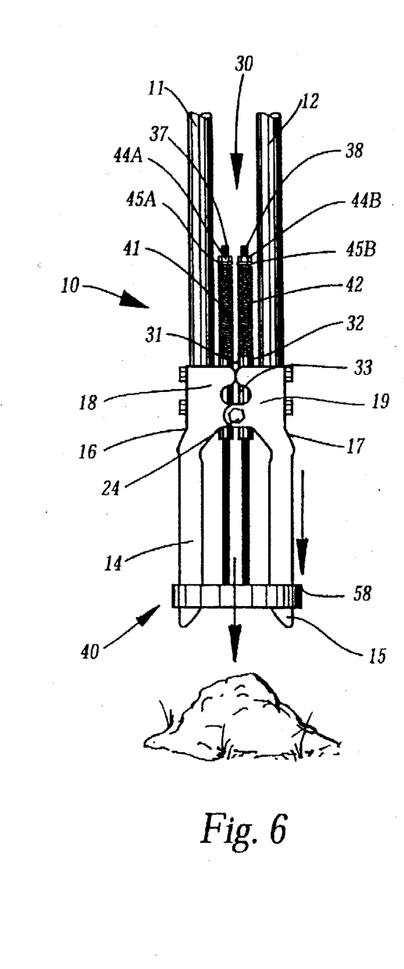

Operation of the posthole digger 10 with cleaning attachment 30 is illustrated sequentially in FIGS. 4, 5, and 6. The posthole digger 10 is driven into the ground and the blades 14, 15 closed to excavate earth matter, as shown in FIG. 4. The posthole digger 10 is then moved away from the resulting hole, and the blades 14, 15 pivoted into the open position to drop any loose earth matter. As shown in FIG. 5, a portion of the excavated earthen matter generally accumulates in an upper area of the blades 14, 15, adhering to both the inside and outside surfaces of the blades 14, 15.

To remove this earthen matter, the user places his foot directly onto one of the opposing side flanges 55 or 56 and depresses the scraper assembly 40 against the biasing force of the coil springs 41, 42. As shown in FIG. 6, as the scraper assembly 40 moves downwardly along the length of the blades 14, 15, the inner scraper plate 54 and outer ring 58 cooperate to simultaneously clean both the inside and outside surfaces of the blades 14 and 15, respectively. Once cleaned, the user releases his foot from the side flange 55 or 56, and the springs 41, 42 return the scraper assembly 40 upwardly to its raised position. The cleaning attachment 30 does not interfere with normal operation of the posthole digger 10, and is usable only when desired to clean adhering mud and other earthen matter from the blades 14, 15.

Figure 7:
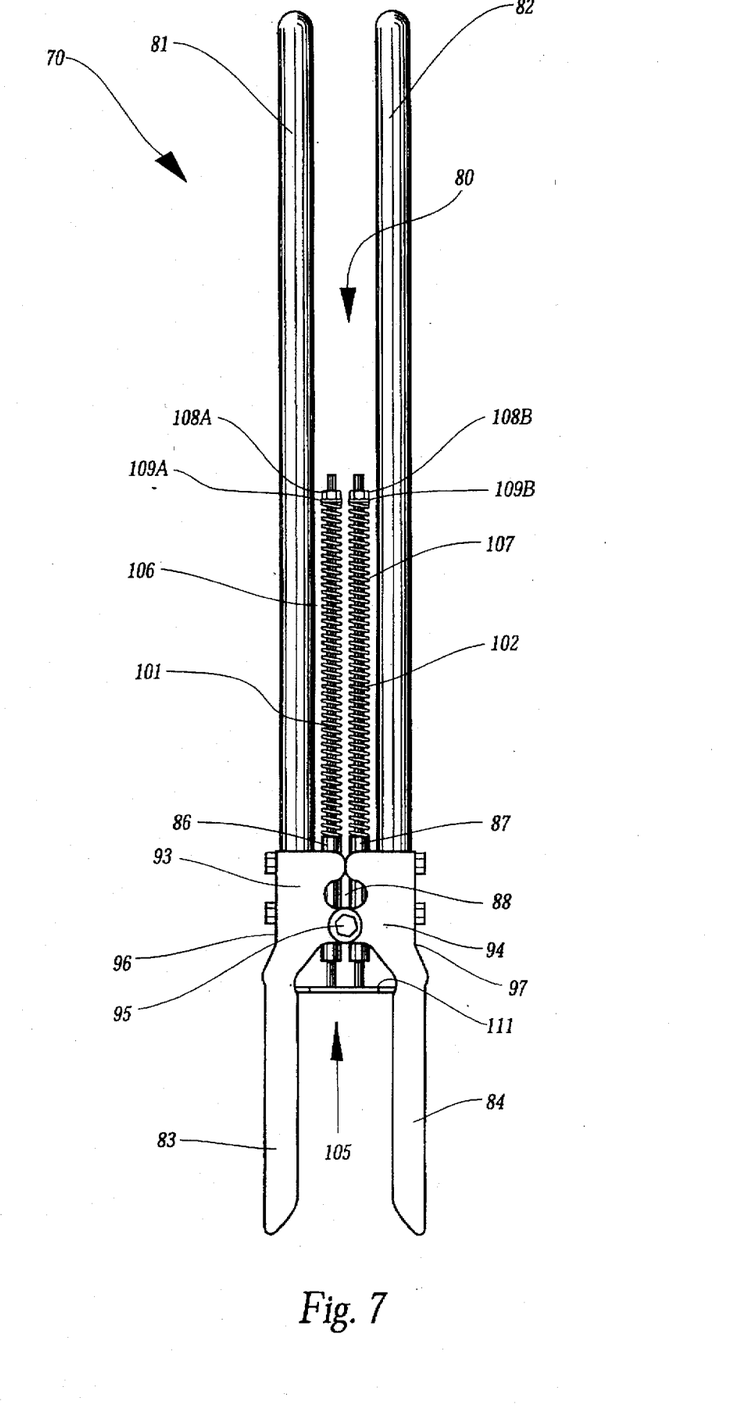
FIG. 7 is a front elevational view of the posthole digger with a cleaning attachment according to a second preferred embodiment of the invention.
Figure 8:
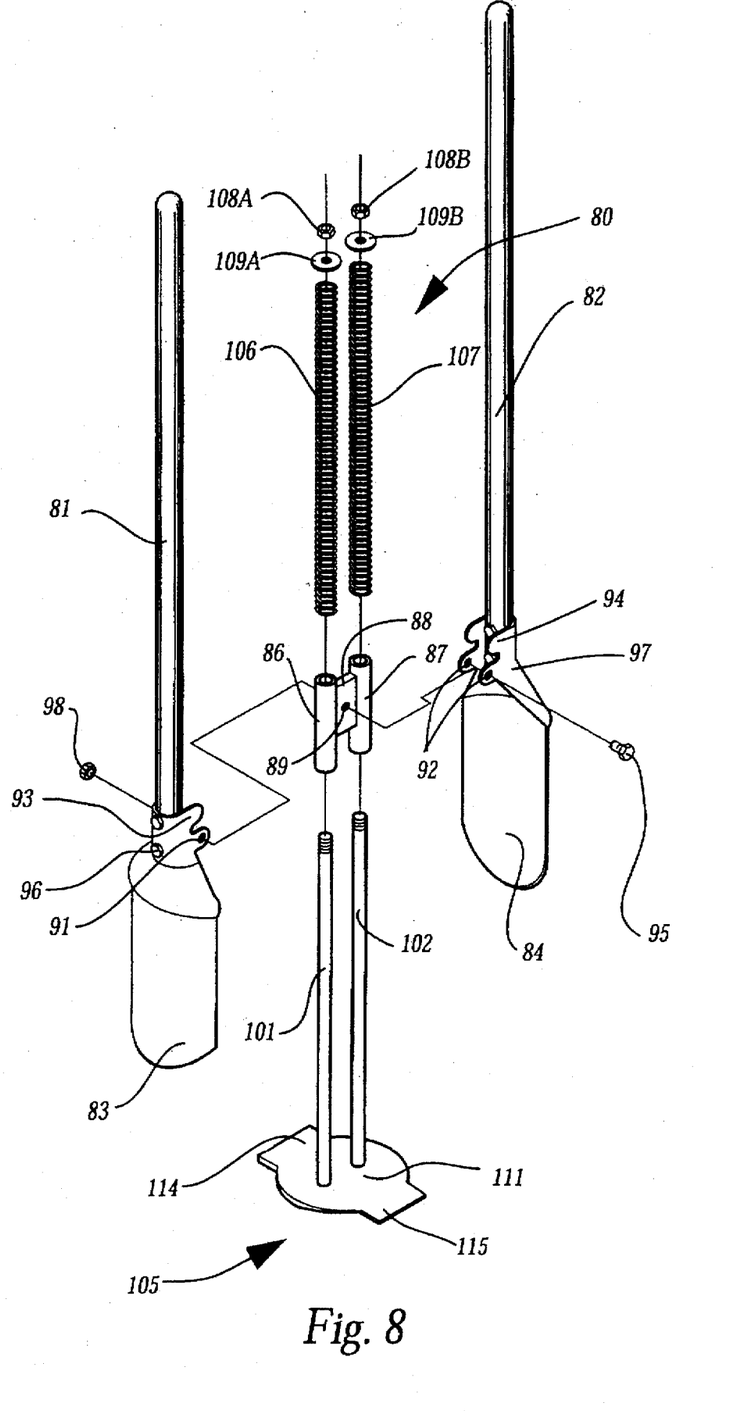
FIG. 8 is an exploded perspective view of the posthole digger and cleaning attachment shown in FIG. 7.

An alternative embodiment of a posthole digger 70 according to the present invention is shown in FIGS. 7 and 8. The posthole digger 70 includes a cleaning attachment 80 located between the handles 81 and 82 and blades 83 and 84 for dislodging earthen matter adhering to the inside surface of the blades 83, 84 during use.

The cleaning attachment 80 includes spaced, hollow stationary sleeves 86 and 87 formed together with a center wall 88. The center wall 88 has an opening 89 for being aligned with openings 91 and 92 of flanges 93 and 94, and receiving a pivot bolt 95 therethrough to locate the sleeves 86, 87 in an area between the connecting portions 96 and 97 of respective blades 83, 84. Once inserted through the aligned openings 89, 91, and 92, a threaded nut 98 is applied to an end of the pivot bolt 95 to hold the bolt 95 in position.

First and second elongated rods 101 and 102 are attached to a scraper assembly 105, and received upwardly through the hollow sleeves 86, 87 to locate the scraper assembly 105 in a raised position shown in FIG. 7. The scraper assembly 105 is normally maintained in this position by coil springs 106 and 107 surrounding the rods 101, 102, and bearing against respective nuts 108A, 108B and washers 109A, 109B at free ends of the rods 101, 102 and the hollow sleeves 86, 87 supported by the pivot bolt 95. Preferably, the free end of each rod 101, 102 and nut 108A, 108B have complementary screw threads for convenient assembly and disassembly.

The scraper assembly 105 includes an inner scraper plate 111 located between the blades 83, 84 and having opposing, integrally-formed side flanges 114 and 115. The inner scraper plate 111 resides in closely spaced relation to the inside surface of the blades 83, 84, and is movable along the length of the blades 83, 84 when in their open position to remove earthen matter adhering to the inside surface of the blades 83, 84 in a manner described above. The side flanges 114, 115 provide sufficient surface area for directly supporting the foot of the user as the scraper assembly 105 is depressed downwardly along the length of the blades 83, 84.

In a further embodiment (not shown), the cleaning attachment of the posthole digger includes only a single hollow sleeve, rod, and spring. The sleeve may be welded directly to the pivot bolt pivotably connecting handles together.

A posthole digger is described above. Various details of the invention may be changed without departing from its scope. Furthermore, the foregoing description of the preferred embodiment of the invention and the best mode for practicing the invention are provided for the purpose of illustration only and not for the purpose of limitation-the invention being defined by the claims.

I claim:

1. In a posthole digger comprising first and second spaced-apart and substantially upright handles for being gripped by a user at respective free ends thereof, pivot means for pivotally attaching the handles together at their respective proximal ends, and first and second cooperating blades attached to said respective proximal ends of the handles, the blades being moveable between a generally open position for penetrating the ground surface, and a generally closed position for excavating, the improvement comprising a cleaning attachment for removing accumulated earthen matter from an inside surface of the first and second blades when in the open position, said cleaning attachment comprising:

(a) a stationary hollow sleeve carried by the pivot means at the proximal ends of the handles;
 (b) an elongate rod extending between the handles, and received within the sleeve for sliding vertical movement relative thereto;
 (c) inner scraper means attached to an end of said rod and positioned between the first and second blades for reciprocating vertical movement along the length of the blades when in the open position;
 (d) biasing means engaging the rod for normally urging the inner scraper means upwardly into a storage position adjacent to a top end of the blades;
 (e) an extension secured to said inner scraper means for being depressed by the foot of a user against the force of said biasing means to move said inner scraper means downwardly along the length of said blades from the top end thereof to a bottom end thereof; and
 (f) outer scraper means secured to said extension and residing in closely-spaced relation to an outside surface of the blades, said outer scraper means being movable in unison with said inner scraper means to clean away accumulated earthen matter from the inside and the outside surfaces of the blades in the open position.

2. A posthole digger according to claim 1, wherein said inner scraper means comprises a scraper plate having opposing perimeter edges residing in closely spaced relation to respective blades in the open position, and for being moved vertically along the length of the blades to clean away accumulated earthen matter from the inside surface of the blades.

3. A posthole digger according to claim 2, wherein said extension comprises an outward-extending flange integrally formed with said scraper plate, and located on one side of the posthole digger for ready access by the user.

4. A posthole digger according to claim 3, and comprising a second outward-extending flange integrally formed with said scraper plate, and located on an opposite side of the posthole digger.

5. A posthole digger according to claim 1, wherein said biasing means comprises a spring carried by the rod, and extending between a top end of the rod and the sleeve for normally urging the inner scraper means upwardly into the storage position.

6. A posthole digger according to claim 1, wherein said outer scraper means comprises a scraper ring attached to the extension, and extending in a generally circular path around the blades to reside adjacent the outside surface of the blades.

7. In a posthole digger comprising first and second spaced-apart and substantially upright handles for being gripped by a user at respective free ends thereof, pivot means for pivotally attaching the handles together at their respective proximal ends, and first and second cooperating blades attached to said respective proximal ends of the handles, the blades being moveable between a generally open position for penetrating the ground surface, and a generally closed position for excavating, the improvement comprising a cleaning attachment for removing accumulated earthen matter from an inside surface of the first and second blades when in the open position, said cleaning attachment comprising:

(a) first and second, stationary hollow sleeves attached together and carried by the pivot means at the proximal ends of the handles;

(b) first and second elongate rods extending between the handles, and received within respective sleeves for unison, sliding vertical movement relative thereto;

(c) inner scraper means attached to respective ends of said rods and positioned between the first and second blades for reciprocating vertical movement along the length of the blades when in the open position;

(d) biasing means engaging the first and second rods for normally urging the inner scraper means upwardly into a storage position adjacent to a top end of the blades; and    (e) an extension secured to said inner scraper means for being depressed by the foot of a user against the force of said biasing means to move said inner scraper means downwardly along the length of said blades from the top end thereof to a bottom end thereof; and    (f) outer scraper means secured to said extension and residing in closely-spaced relation to an outside surface of the blades, said outer scraper means being movable in unison with said inner scraper means to clean away accumulated earthen matter from the inside and the outside surfaces of the blades in the open position.

8. A posthole digger according to claim 7, wherein said inner scraper means comprises a scraper plate having opposing perimeter edges residing in closely spaced relation to respective blades in the open position, and for being moved vertically along the length of the blades to clean away accumulated earthen matter from the inside surface of the blades.

9. A posthole digger according to claim 8, wherein said extension comprises an outward-extending flange integrally formed with said scraper plate, and located on one side of the posthole digger for ready access by the user.

10. A posthole digger according to claim 9, and comprising a second outward-extending flange integrally formed with said scraper plate, and located on an opposite side of the posthole digger.

11. A posthole digger according to claim 10, wherein said outer scraper means comprises an outer scraper ring attached to the first and second outward-extending flanges, and extending in a generally circular path around the blades to reside adjacent the outside surface of the blades.

12. A cleaning attachment for use in a posthole digger comprising first and second spaced-apart and substantially upright handles for being gripped by a user at respective free ends thereof, pivot means for pivotally attaching the handles together at their respective proximal ends, and first and second cooperating blades attached to said respective proximal ends of the handles, the blades being moveable between a generally open position for penetrating the ground surface, and a generally closed position for excavating, the cleaning attachment being adapted for removing accumulated earthen matter from an inside surface of the first and second blades when in the open position, said cleaning attachment comprising:

(a) a stationary hollow sleeve carried by the pivot means at the proximal ends of the handles;

(b) an elongate rod extending between the handles, and received within the sleeve for sliding vertical movement relative thereto;

(c) inner scraper means attached to an end of said rod and positioned between the first and second blades for reciprocating vertical movement along the length of the blades when in the open position;

(d) biasing means engaging the rod for normally urging the inner scraper means upwardly into a storage position adjacent to a top end of the blades; and    (e) an extension secured to said inner scraper means for being depressed by the foot of a user against the force of said biasing means to move said inner scraper means downwardly along the length of said blades from the top end thereof to a bottom end thereof; and    (f) outer scraper means secured to said extension and residing in closely-spaced relation to an outside surface of the blades, said outer scraper means being movable in unison with said inner scraper means to clean away accumulated earthen matter from the inside and the outside surfaces of the blades in the open position.

13. A cleaning attachment according to claim 12, wherein said inner scraper means comprises a scraper plate having opposing perimeter edges for residing in closely spaced relation to respective blades in the open position, and for being moved vertically along the length of the blades to clean away accumulated earthen matter from the inside surface of the blades.

14. A cleaning attachment according to claim 13, wherein said extension comprises an outward-extending flange integrally formed with said scraper plate, and located on one side of the posthole digger for ready access by the user.

15. A cleaning attachment according to claim 14, and comprising a second outward-extending flange integrally formed with said scraper plate, and located on an opposite side of the posthole digger.

16. A cleaning attachment according to claim 12, wherein said biasing means comprises a spring carried by the rod, and extending between a top end of the rod and the sleeve for normally urging the inner scraper means upwardly into the storage position.

17. A posthole digger according to claim 12, wherein said outer scraper means comprises a scraper ring attached to the extension, and extending in a generally circular path around the blades to reside adjacent the outside surface of the blades.

\* \* \* \* \*